United States Patent [19]

Kanda

[11] 4,249,216
[45] Feb. 3, 1981

[54] FACSIMILE TRANSCEIVER APPARATUS

[75] Inventor: Hajime Kanda, Tokyo, Japan

[73] Assignee: Ricoh Company, Ltd., Tokyo, Japan

[21] Appl. No.: 66,601

[22] Filed: Aug. 14, 1979

[30] Foreign Application Priority Data

Sep. 4, 1978 [JP] Japan .................... 53-107576

[51] Int. Cl.³ .......................... H04N 1/32
[52] U.S. Cl. .................. 358/257; 358/280
[58] Field of Search .............. 358/257, 280, 256

[56] References Cited

U.S. PATENT DOCUMENTS

| | | | |
|---|---|---|---|
| 2,537,199 | 1/1951 | Wise | 358/257 |
| 3,914,539 | 10/1975 | Hashimoto | 358/257 |
| 3,920,895 | 11/1975 | Vieri | 358/257 |
| 4,064,389 | 12/1977 | Patterson | 358/256 |
| 4,136,261 | 1/1979 | Wada | 358/256 |

*Primary Examiner*—Howard W. Britton
*Attorney, Agent, or Firm*—David G. Alexander

[57] ABSTRACT

Code signals representing a dialed telephone number, a transmission start time, a number of original documents transmitted, a transmission end time or the like are produced and stored in a character memory (28) of a facsimile transceiver (11). The codes are fed through a character generator (29) to produce data signals in the facsimile line scan format which are stored in a mass storage such as a magnetic tape unit (32). The signals are fed from the mass storage (32) to a printer (14) of the facsimile transceiver (11) for reproduction when desired.

10 Claims, 17 Drawing Figures

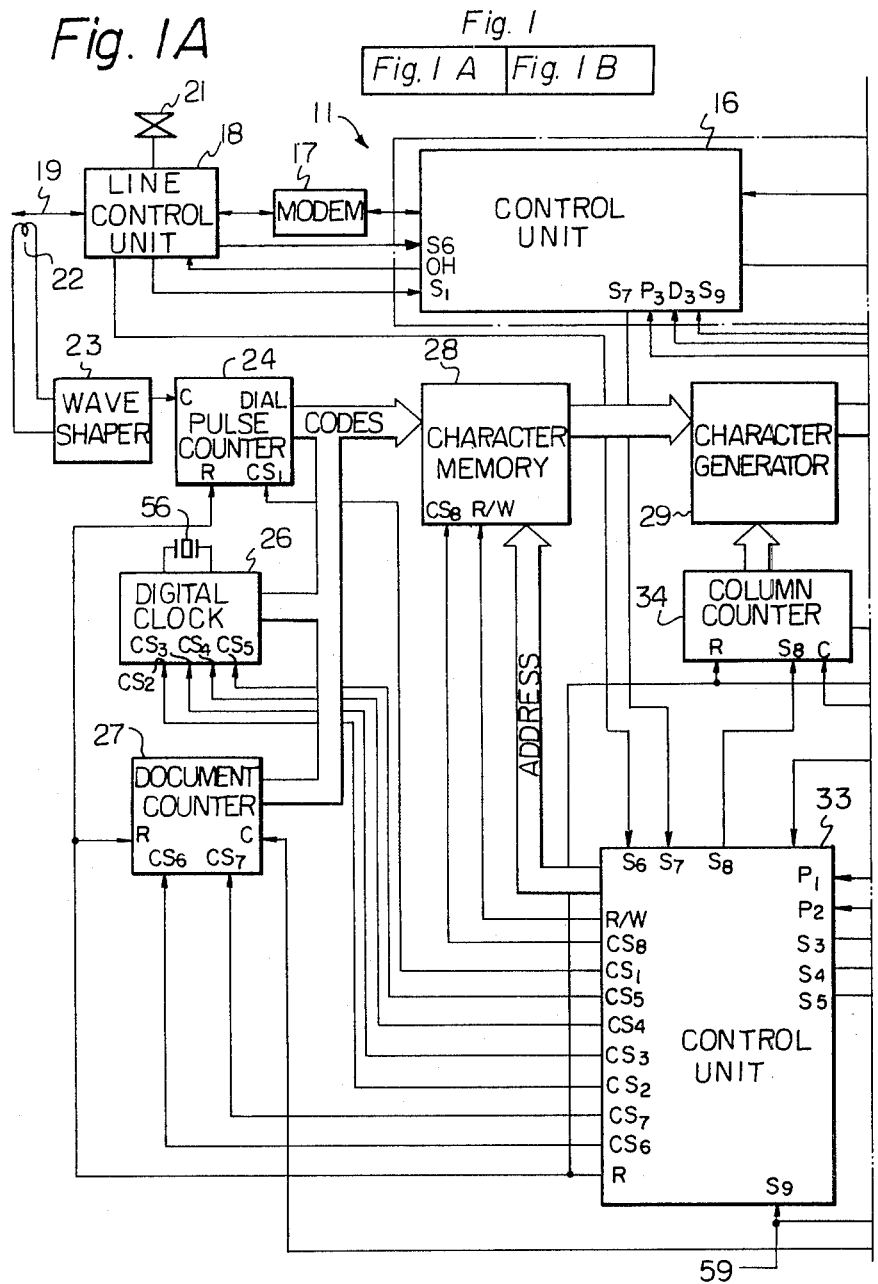

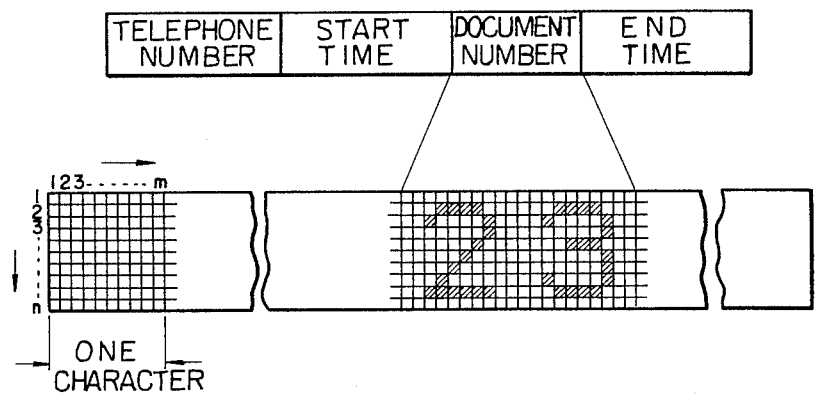
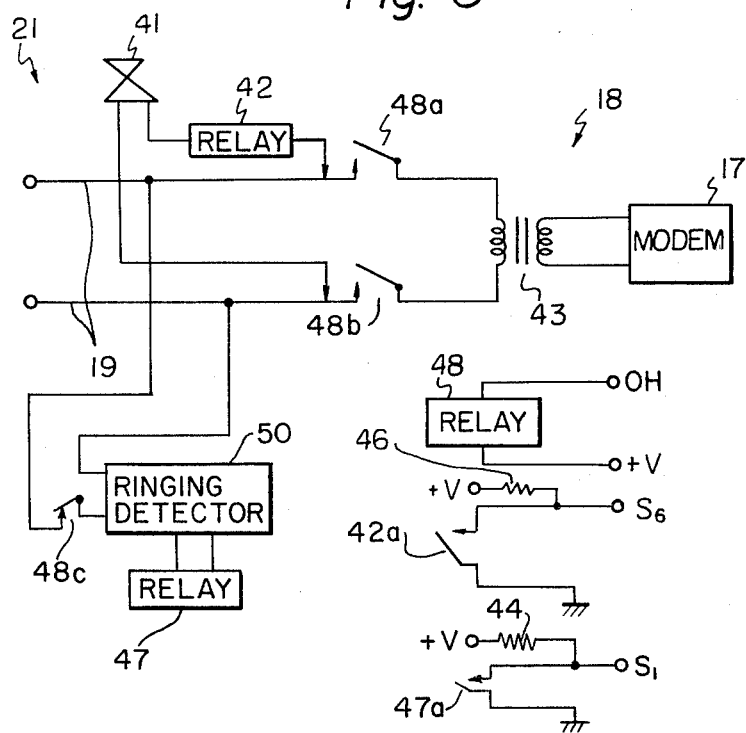

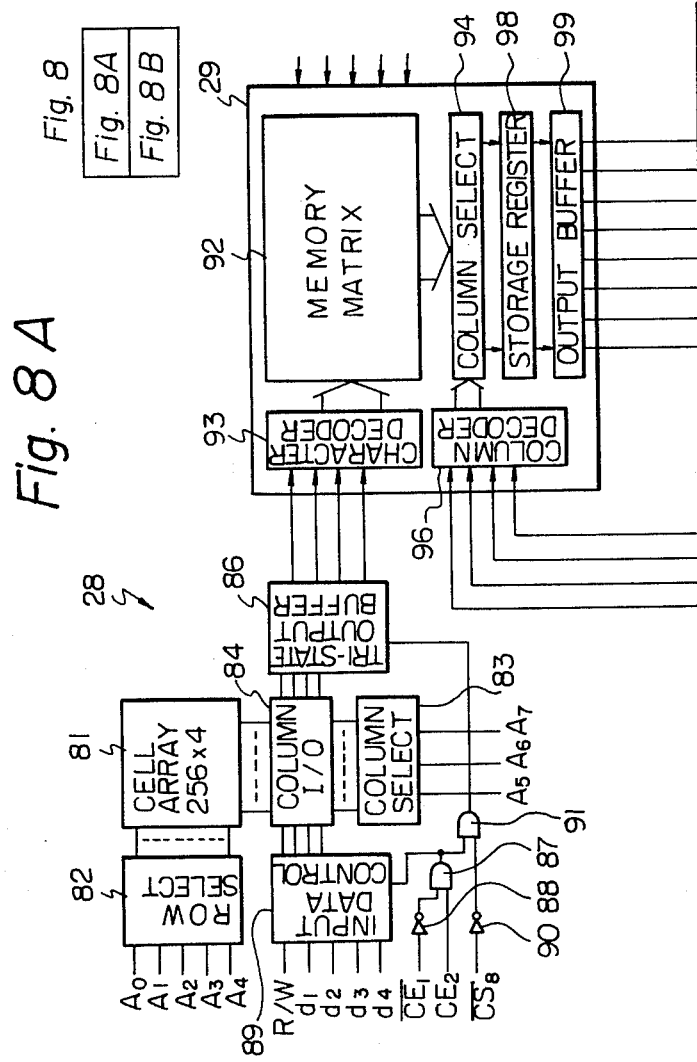

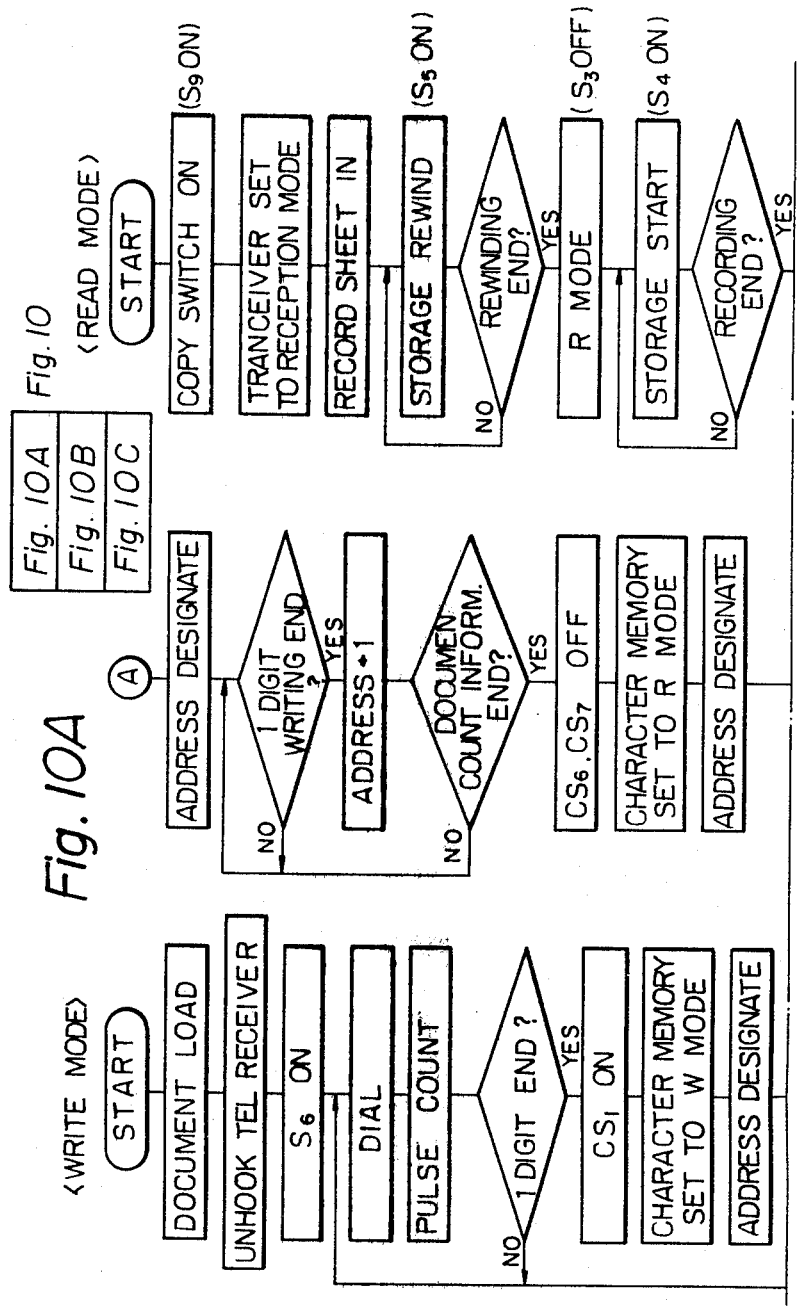

FACSIMILE TRANSCEIVER APPARATUS

BACKGROUND OF THE INVENTION

The present invention relates to a facsimile transceiver apparatus comprising means for automatically storing codes representing transmission information and enabling the codes to printed on demand.

A typical facsimile transceiver comprises a scanner for scanning an original document and producing data signals representing the document. The data signals are fed over a public telephone line or the like to a receiving facsimile transceiver which reproduces the document in response to the data signals.

In the management of facsimile systems, it is necessary to record various data such as the telephone number or other identification of a transceiver to which data was transmitted, the length of time of the transmission, the number of document transmitted and the like. Conventionally, such data is recorded manually in a ledger or journal.

However, manual recording of such data leads to several serious drawbacks such as frequent errors and omissions by careless operating personnel and the possibility of unauthorized use of the facsimile system.

SUMMARY OF THE INVENTION

A facsimile apparatus embodying the present invention includes a scanner for scanning an original document and producing data signals representing the document and a printer for reproducing an original document in response to received data signals, and is characterized by comprising code generator means for producing identification code signals, memory means for storing the code signals, character generator means for converting the code signals into data signals for reproduction by the printer, and control means for causing the code signals to be read out of the memory means and fed through the character generator means to the printer for printing.

In accordance with the present invention, code signals representing a dialed telephone number, a transmission start time, a number of original documents transmitted, a transmission end time or the like are produced and stored in a character memory of a facsimile transceiver. The codes are fed through a character generator to produce data signals in the facsimile line scan format which are stored in a mass storage such as a magnetic tape unit. The signals are fed from the mass storage to a printer of the facsimile transceiver for reproduction when desired.

It is an object of the present invention to provide a facsimile transceiver apparatus comprising means for automatically storing and recording identification code data.

It is another object of the present invention to provide a facsimile transceiver apparatus which is capable of recording identification code data using a printer of the apparatus.

It is another object of the present invention to eliminate errors and omissions in the recording of identification code data and also the possibility of unauthorized use of the system.

It is another object of the present invention to provide a generally improved facsimile transceiver apparatus.

Other objects, together with the foregoing, are attained in the embodiments described in the following description and illustrated in the accompanying drawing.

BRIEF DESCRIPTION OF THE DRAWING

FIGS. 1, 1A and 1B, is an overall block diagram of a facsimile transceiver apparatus embodying the present invention;

FIG. 2 is a diagram illustrating identification code data;

FIG. 3 is a schematic diagram of a line control unit of the apparatus;

FIGS. 8, 8A and 8B is a detailed electrical schematic diagram of a character memory, character generator, multiplexer and control counters of the apparatus;

FIGS. 10, 10A, 10B and 10C, is a flowchart illustrating the operation of the apparatus.

DESCRIPTION OF THE PREFERRED EMBODIMENTS

While the facsimile transceiver apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1B:
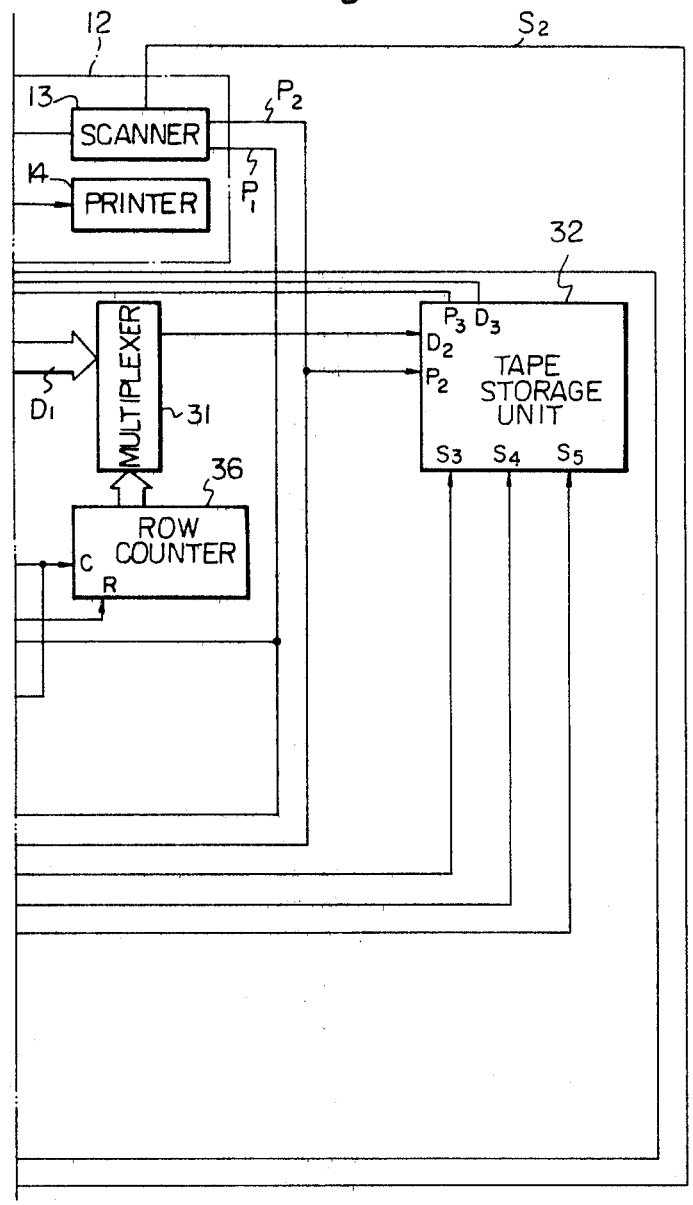

Referring now to FIG. 1 of the drawing, a facsimile transceiver apparatus embodying the present invention is generally designated as 11 and comprises a facsimile transceiver 12. The transceiver 12 comprises a scanner 13 for scanning an original document and producing data signals representing the document, a printer 14 for reproducing a document in response to received data signals from a remote transceiver and a control unit 16 for controlling the transmission or reception operation.

An original document is scanned by the scanner 13 in an orthogonal pattern of scan lines. Each scan line comprises data signals representing the corresponding linear portion of the document followed by a line sync signal. Preferably, the data signals are compressed by run length encoding or some other arrangement to reduce the transmission time.

Data signals from the scanner 13 are fed through a modem 17 and a line control unit 18 to a remote transceiver via a public telephone line 19. A telephone 21 is provided for dialing the telephone number of the intended remote transceiver. Received data signals pass through the line control unit 18 and modem 17 and are applied to the printer 14 for reproducing the original document scanned by the remote transceiver.

When the operator dials the number of the intended transceiver by means of the telephone 21, the dial pulses are picked up by a pickup 22 and fed through a wave shaper 23 to a dial pulse counter 24 which produces character code signals representing the dialed telephone number preferably in the binary coded decimal (BCD) format.

A digital clock 26 produces code signals representing the transmission starting time and transmission ending time. A document counter 27 produces a document number code which indicates the number of original documents scanned by the scanner 13 for transmission. The telephone number code, start time code, document number code and end time code are sequentially stored in a character memory 28.

After transmission is finished, the codes are fed from the memory 28 through a character generator 29 and a multiplexer 31 and stored in a mass storage unit shown as being in the form of a magnetic tape storage unit 32. The signals produced by the multiplexer 31 are in the facsimile line scan format. A control unit 33 produces signals which control the character generator 29, a column counter 34, a row counter 36 and other units of the apparatus 11 as will become clear from further description.

When desired, the tape storage unit 32 is controlled to feed the signals to the printer 14 which prints or records the codes in response thereto. The unit 32 preferably has enough capacity to store the identification codes for a large number of facsimile transmission operations such as for one day or one week. Thus, the identification codes for such a period of time may be printed by the printer 14 on demand in the form of a table.

For a facsimile transmission operation, the operator dials the number of the intended remote transceiver (not shown) by means of the telephone 21. The line control unit 18 produces a hook signal S6 and feeds the same to the control unit 33 when the telephone receiver is off the hook. If the telephone call is aborted or a busy signal is received, no further action occurs except for the operator to hang up the telephone receiver. This causes the signal S6 to go low. However, if the telephone connection is made, the control unit 16 produces a transmit signal S7 which is fed to the control unit 33 and controls the scanner 13 to begin scanning an original document (not shown) placed therein.

The counters 24 and 27 are initially reset by a reset pulse R from the control unit 33. The dial pulse counter 24 is constructed to count the dial pulses of the dialed telephone number and produce a telephone number code in BCD format corresponding thereto. In response to the signal S7, the control unit 33 feeds a signal CS1 to the counter 24 which causes the telephone number code to be stored in the character memory 28 digit by digit in successively higher memory locations corresponding to addresses fed to the memory 28 by the control unit 33. Then, the control unit 33 feeds signals CS2, CS3, CS4 and CS5 to the digital clock 26 which cause codes corresponding to the year, month, day and minute of the start of transmission to be stored in the memory 28 to constitute in combination a transmission start time code.

As transmission proceeds, the document counter 27 counts the number of original documents placed in the scanner 13 for scanning and transmission in response to document load signals S2. When transmission is completed, the transmit signal S7 goes low. In response, the control unit 33 feeds signals CS6 and CS7 to the document counter 27 which causes the document number code indicating the number of documents transmitted to be stored in the memory 28. Then, the control unit 33 again feeds the signals CS2, CS3, CS4 and CS5 to the digital clock 26 causing the same to feed another time code to the memory 28. However, the second time code indicates the time at which transmission ended, or a transmission end time code.

After all of the codes have been stored in the memory 28, the control unit 33 changes a read-write signal R/W from the write mode to the read mode and feeds an output enable signal CS8 to the memory 28. The address fed from the control unit 28 to the memory 28 is sequentially increased to feed the character codes from the memory 28 to the character generator 29.

FIG. 2 illustrates the appearance of the codes as printed by the printer 14. The printer 14 is of the electrostatic or other type and functions to print a horizontal scan line of data signals, increment for vertical scan, print the next horizontal scan line and so on until printing is completed. Each character of the various codes is represented by a matrix of m-dots in the horizontal direction and n-dots in the vertical direction. A common matrix is 5 (horizontal) by 7 (vertical), although the invention is not so limited (m=5 and n=7).

Taking the exemplary case of a 5×7 dot matrix, the character generator 29 functions to output a column of dots corresponding to two input variables; the character code (BCD) from the memory 28 and a column address (which ranges from 0 to 4) from the column counter 34. The column counter 34 is initially reset by the reset signal R as is the row counter 36. However, in response to horizontal clock pulses P1 from the scanner 13, the column counter 34 is continuously incremented from 0 to 4 and then back to 0.

The address applied to the character memory 28 from the control unit 33 is incremented once in response to each five clock pulses P1. The effect is that the character generator 29 produces seven video data signals in parallel in response to each clock pulse P1. The seven data signals D1 correspond to the column of dots of the character in the column indicated by the column address from the column counter 34. For example, if the count from the column counter is three, the character generator 29 will produce as the signals D1 the fourth column of the character whose code is applied to the character generator 29 from the memory 28. The character generator 29 produces the five columns of the first character, then the five columns of the next character, etc. until an entire scan line is synthesized.

The row counter 36 is incremented by a carry output of the column counter 34 such that the row counter 36 is incremented at the end of each horizontal scan line. Initially, the count in the counter 36 will be zero and the multiplexer 31 will gate therethrough only the signal D1 corresponding to the top dot in the column, or the dot signal representing row one of the column. These dot signals are fed to the storage unit 32 as data signals D2. A line sync signal P3 is added at the end of each horizontal scan line.

After producing the first horizontal scan line, the column counter 34 overflows and produces the carry signal which increments the row counter 36. The character codes are again fed from the memory 28 to the character generator 29. However, this time the multiplexer 31 gates therethrough as the signals D2 only the dot signals in the second row of the columns to produce the second horizontal scan line. This process is repeated seven times to produce seven horizontal scan lines representing the identification codes. In other words, the codes are sequentially applied from the memory 28 to the character generator 29 seven times. During these seven times, the multiplexer 31 gates out the first to seventh (upper to lower) rows of the column signals produced by the character generator 29.

Further illustrated are line sync pulses P2 fed from the scanner 13 to the control unit 33 and storage unit 32 for generating the line sync signals P3.

The control unit 33 controls the tape storage unit 32 by means of a tape read-write signal S3, a start-stop signal S4 and a rewind signal S5. For writing the signals D2 on the tape, the signal S3 is made high to enable recording and the signal S4 is made high to cause the tape to be driven. After all of the data signals are stored on the tape, the signal S4 is made low to stop the tape.

Figure 10B:
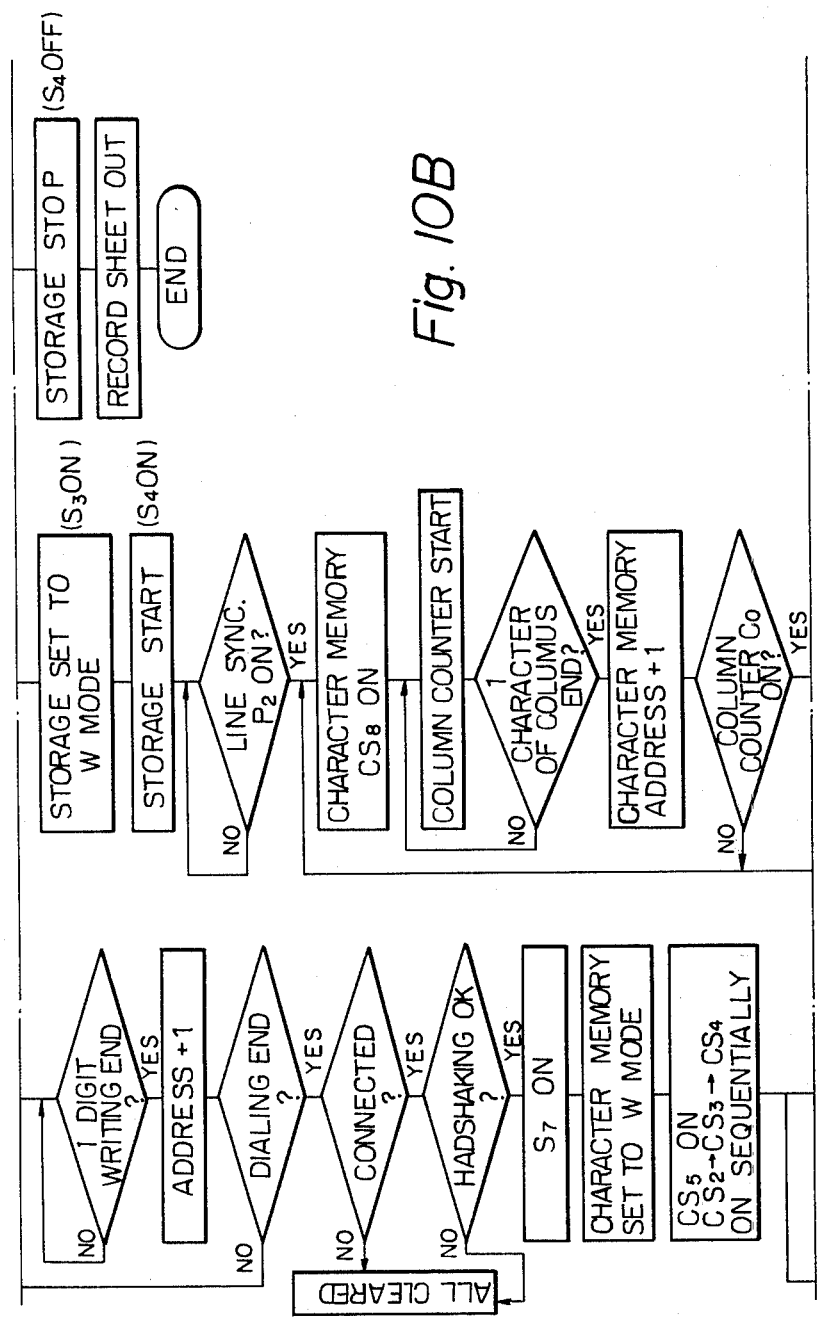
Figure 10C:
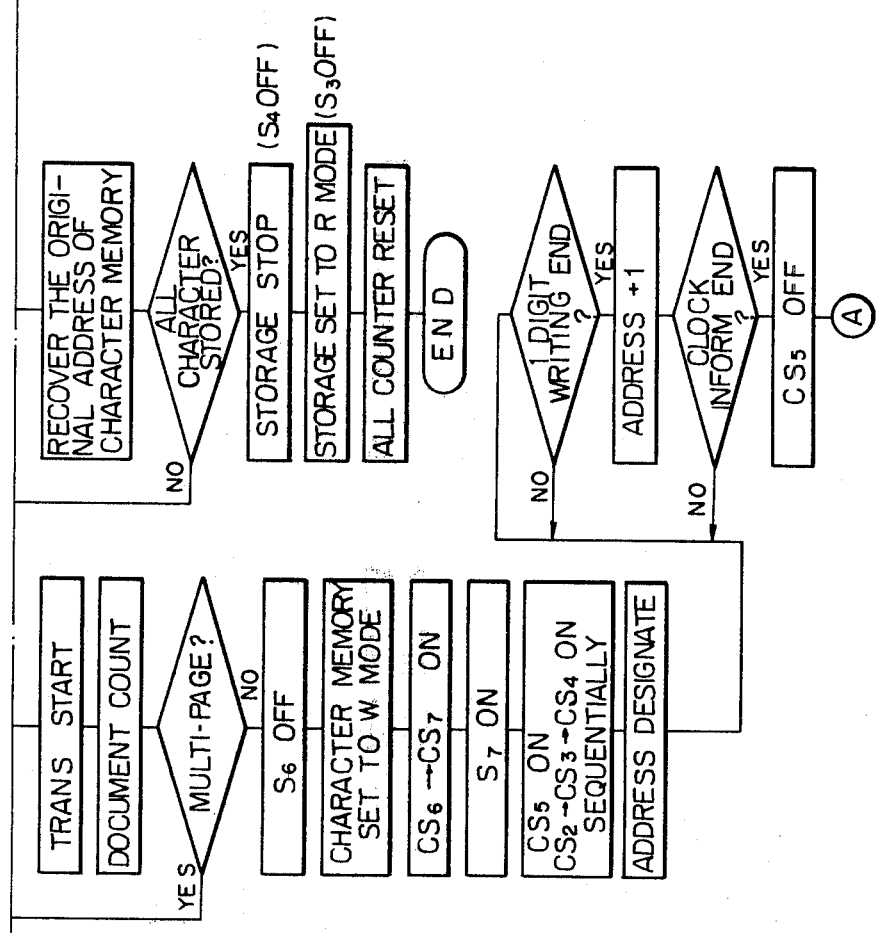

All of the codes stored in the storage unit 32 may be printed at any time on damand by the printer 14. This is accomplished by the operator depressing a print or copy button (not shown) which generates a copy signal S9. This causes the data signals to be played back from the tape in the unit 32 as data signals D3 and fed together with the line sync signals P3 to the printer 14. The printer 14 prints the codes in the same manner as it prints in response to incoming facsimile signals since the codes have been converted to the horizontal line scan format of the facsimile system by the character generator 29 and multiplexer 31. The operation of the apparatus 11 is presented in flowchart form in FIG. 10.

In response to the signal S9, the control unit 33 makes the rewind signal S4 high to cause the tape in the unit 32 to be rewound. Then, the control unit 33 makes the signal S4 low to stop rewinding, makes the signal S3 high to drive the tape and makes the signal S2 low to enable the playback or read mode. The signal S3 is made low after all data codes have been printed by the printer 14 to stop the tape.

The line control unit 18 is shown in FIG. 3 as being of the NCU type comprising a matching transformer 43 connected between the line 19 and modem 17. The telephone 21 comprises a handset 41 and a relay coil 42 connected across the line 19. A normally open contact 42a of the relay coil 42 is connected in series with a resistor 46 between a power source +V and ground. When the telephone handset 41 is taken off the hook, the relay coil 42 is energized, the contacts 42a are closed and a signal S6 appearing at the junction of the contacts 42a and resistor 46 goes from high to low indicating to the control unit 16 that the telephone handset 41 is off the hook.

For transmission to a remote transceiver, the operator takes the handset 41 off the hook and the low signal S6 is generated to energize the control unit 16. When proper connection is made to the line 19, a dial tone will be produced which is heard by the operator. The operator then dials the number of the remote transceiver to which it is desired to transmit. Upon connection, a tone will be produced which is heard by the operator. In response, the operator depresses a transmit button (not shown). This causes the control unit 16 to generate a connection signal OH which energizes a relay coil 48. The relay coil 48, when energized, closes relay contacts 48a and 48b to connect the transformer 43 and modem 17 to the line 19. Enerzigation of the relay coil 48 also opens relay contacts 48c to disconnect a ringing detector 50 from the line 19. The remote facsimile transceiver then generates a response signal which is decoded by the control unit 16 and facsimile transmission is begun.

For reception, a ringing signal is detected by the ringing detector 50 which energizes a relay coil 47. This closes relay contacts 47a which are connected in series with a resistor 44 between the source +V and ground. A signal S1 at the junction of the relay contacts 47a and resistor 44 goes low to inform the control unit 16 that the transceiver 11 is being called. The control unit 16 generates a high OH signal which energizes the relay coil 48 to close the contacts 48a and 48b and thereby connect the transformer 43 to the line 19 for reception. The contacts 48c are opened to disconnect the ringing detector 50 from the line 19.

Figure 4:
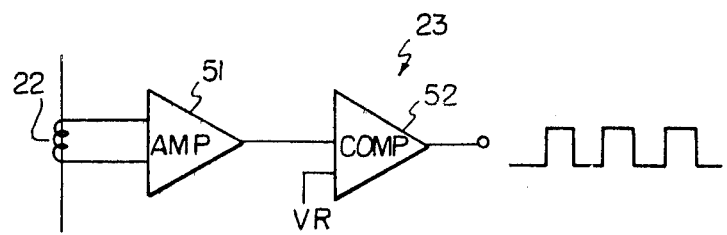
FIG. 4 is a schematic diagram of a wave shaper of the apparatus.

The wave shaper 23 is shown in FIG. 4 as comprising an amplifier 51 which amplifies the dial pulses and a comparator 52 which functions as a quantizer. The comparator 52 produces a high output when the input signal is higher than a reference voltage VR and vice-versa. Thus, the comparator 52 produces a clean square wave output as illustrated.

Figure 5:
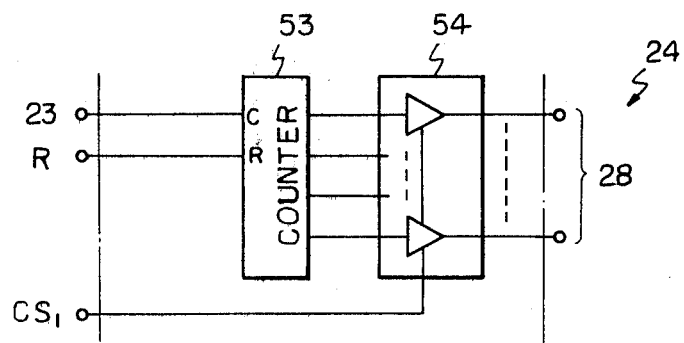
FIG. 5 is a schematic diagram of a dial pulse counter of the apparatus.

The dial pulse counter 24 is shown in FIG. 5 as comprising a multi-digit BCD counter 53 having outputs connected to inputs of a tri-state buffer 54. The buffer 54 gates the telephone number codes to the memory 28 in response to the signal CS1 which enables the buffer 54.

Figure 6:
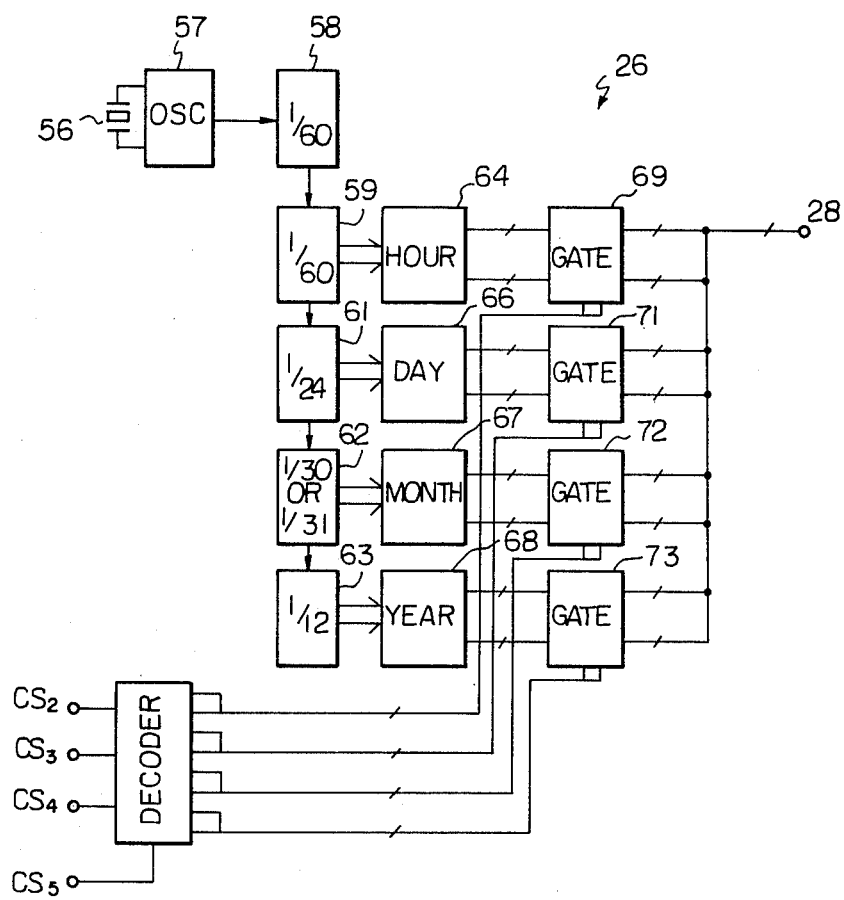
FIG. 6 is a schematic diagram of a digital clock of the apparatus.

The digital clock 26 is shown in FIG. 6 as comprising an oscillator 57 controlled by a crystal 56 to produce high frequency clock pulses. The output of the oscillator 57 is fed through frequency counters 58, 59, 61, 62 and 63 in cascade which have frequency division ratios as indicated in the drawing. The outputs of the frequency dividers 59, 61, 62 and 63 are applied to BCD counters or converters 64, 66, 67 and 68 which count the hour, day, month and year respectively. The outputs of the counters or converters 64, 66, 67 and 68 are connected to the memory 28 through gates 69, 71, 72 and 73 which gate the codes to the memory 28 in response to the signals CS2, CS3, CS4 and CS5 respectively.

Figure 7:
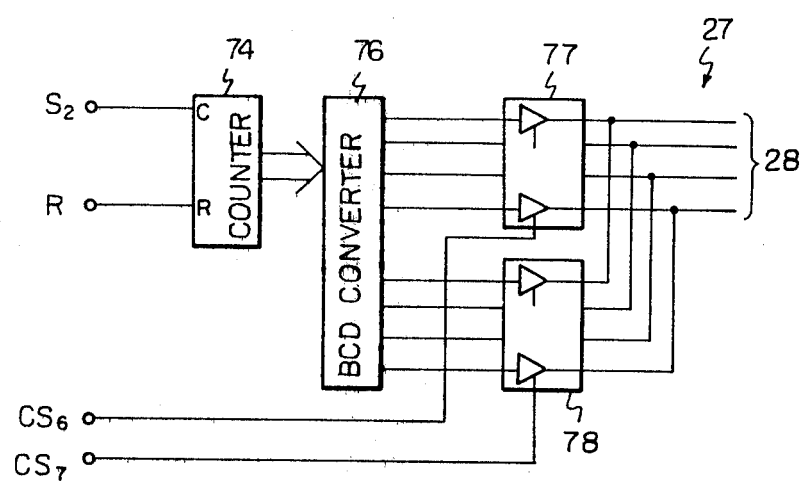
FIG. 7 is a schematic diagram of a document counter of the apparatus.

The document counter 27 is shown in FIG. 7 as comprising a binary counter 74 which counts the signals S2. The output of the counter 74 is connected to a binary to BCD converter 76 which produces high order and low order digits of the count which are applied to the memory 28 through tri-state buffers 77 and 78 in response to the signals CS6 and CS7 respectively.

Figure 8B:
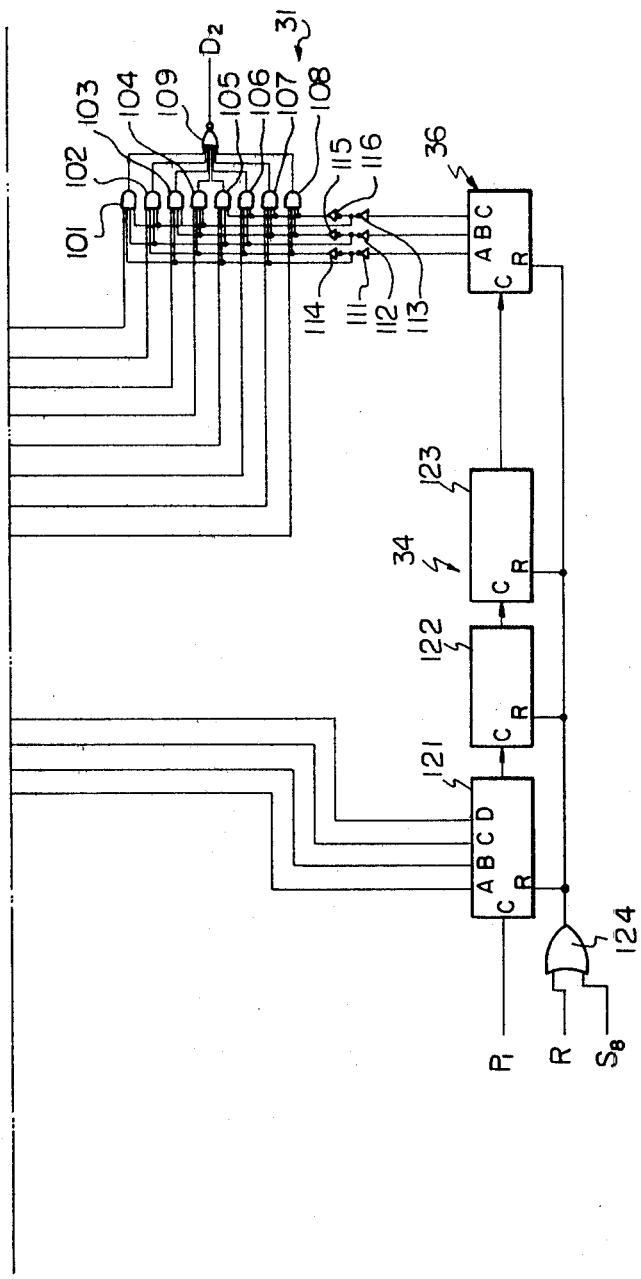

The memory 28, character generator 29, multiplexer 31 and counters 34 and 36 are shown in FIG. 8. The memory 28 is typically of the type 4039 and comprises a cell array of 256 words of 4 bits each. Thus, each BCD code is 4 bits. The codes are applied to data inputs d1, d2, d3 and d4. The address is applied to row address inputs A0, A1, A2, A3 and A4 and column address inputs A5, A6 and A7 from the control unit 33 to a row select 82 and a column select 83. The outputs of elements 82 and 83 address a particular location in the array 81. Data is written into the array 81 or read out of the array 81 at the addressed memory location through a column I/O 84.

Data read out of the cell 81 passes through the column I/O 84 and appears at the output of a tri-state output buffer 86. Further illustrated are chip enable signals $\overline{CE1}$ and CE2 which are applied to inputs of an AND gate 87, the former through an inverter 88. The output of the AND gate 87 is connected to an input data control 89 and the input of an AND gate 91. The signal $\overline{CS8}$ is applied through an inverter 90 to another input of the AND gate 91, the output of which is connected to the output buffer 86.

The character generator 29 is typically of the type 4043 and comprises a read only memory matrix 92. The output of the buffer 86 of the memory 28 is connected to the matrix 92 through a character decoder 93. The four bit BCD codes from the memory 28 serve as memory address inputs to the matrix 92. The dot pattern of the character corresponding to the code is stored in the addressed location and is applied to a column select 94. The column select 94 passes therethrough the column corresponding to the column address applied to the column select 94 from the column counter 34 through a column decoder 96. The column signals are fed to an output buffer 99 through a storage register 98.

The output buffer 99 produces the seven column dot signals and in addition may be adapted to produce an interline dot signal for a total of eight outputs as illustrated. These signals are applied to inputs of AND gates 101, 102, 103, 104, 105, 106, 107 and 108 respectively of the multiplexer 31. The multiplexer 31 is typically of the type 74152 with the outputs of the AND gates 101 to 108 connected to inputs of a NOR gate 109 which produces at its output the signals D2. The AND gates 101 to 108 are sequentially enabled through a decoder matrix consisting of inverters 111, 112, 113, 114, 115 and 116 connected as illustrated in response to respective count outputs from the row counter 36.

The column conter 34 comprises three four bit counters 121, 122 and 123 connected in cascade with the outputs of the counter 121 connected in parallel to the column decoder 96 of the character generator 29. The carry output of the counter 123 is connected to the count input of the row counter 36 which is a three bit counter and has its parallel outputs connected as illustrated to the inputs of the inverters 111, 112 and 113 respectively. The reset signal R and the count start signal S8 are applied through an OR gate 124 to reset inputs of the counters 121, 122, 123 and 36. The pulses P1 are connected to a count input of the counter 121. The counters 122 and 123 function to provide a carry output at the end of each horizontal scan line while the counter 121 cycles the character generator 29.

Figure 9:
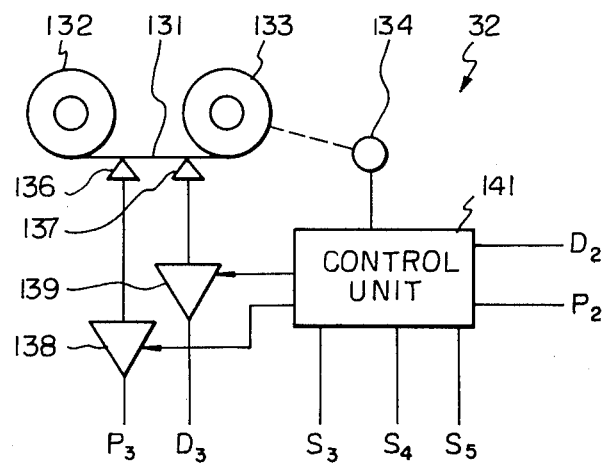
FIG. 9 is a schematic diagram of a magnetic tape storage unit of the apparatus.

The tape storage unit 32 is shown in FIG. 9 as comprising a magnetic tape 131 wound around reels 132 and 133 which are driven by a motor 134. Typically, the tape 131 is of the two track binary type with read-write heads 136 and 137 provided for the tracks. The heads 136 and 137 are connected to read-write amplifiers 138 and 139 respectively which are controlled by a control unit 141. The signals D2 and P2 are applied through the control unit 141 to the amplifiers 138 and 139 and heads 136 and 137. The signals P3 and D3 read from the tape 131 are passed out of the amplifiers 138 and 139. The control unit 141 also controls the motor 134, etc. in response to the signals S3, S4 and S5.

In summary, it will be seen that the present invention provides a facsimile transceiver apparatus which overcomes the drawbacks of the prior art and enables automatic and error free recording of transmission identification data. Various modifications will become possible for those skilled in the art after receiving the teachings of the present disclosure without departing from the scope thereof. For example, the identification codes are described herein as indicating the telephone number, transmission start and end times and number of documents transmitted to a remote transceiver. However, the codes may indicate other data such as the name or address of the transceiver to which the data was transmitted. If the memory 28 is provided with a large enough capacity, it is possible to eliminate the tape storage unit 32. In this case, the data is passed directly from the multiplexer 31 to the printer 14, and the memory 28 is adapted to store codes for a large number of transmissions. It will be readily understood that the present apparatus does not require a separate printer for printing the code data and is therefore very desirable from a cost standpoint, in addition to reliability. Another typical modification is to embody the storage unit 32 as a random access memory, floppy disc memory or the like. Overall control may be performed by a microprocessor such as of the type MCS-85, although not described in detail.

What is claimed is:

1. A facsimile apparatus including a scanner for scanning an original document and producing data signals representing the document and a printer for reproducing an original document in response to received data signals, characterized by comprising:
   code generator means for producing identification code signals;
   memory means for storing the code signals;
   character generator means for converting the code signals into data signals for reproduction by the printer; and
   control means for causing the code signals to be read out of the memory means and fed through the character generator means to the printer for printing.

2. An apparatus as in claim 1, further comprising mass storage means, the control means causing signals to be written into the mass storage means from the character generator and read out of the mass storage means to the printer.

3. An apparatus as in claim 2, in which the mass storage means comprises a magnetic tape unit.

4. An apparatus as in claim 1, in which the character generator means comprises a character generator and a multiplexer.

5. An apparatus as in claim 1, further comprising means for dialing an intended receiver telephone number, the code generator means comprising sensor means for sensing the telephone number and producing a telephone number code in response thereto.

6. An apparatus as in claim 5, in which the sensor means comprises counter means for counting dial pulses.

7. An apparatus as in claim 1, in which the code generator means comprises sensor means for sensing a transmission start time and producing a start time code in response thereto.

8. An apparatus as in claim 7, in which the sensor means comprises a digital clock.

9. An apparatus as in claim 7, in which the sensor means is further constructed to sense a transmission end time and produce an end time code in response thereto.

10. An apparatus as in claim 1, in which the code generator means comprises document counter means for counting a number of original documents scanned by the scanner and producing a document number code in response thereto.

* * * * *